US006971783B2

(12) United States Patent
Owen

(10) Patent No.: US 6,971,783 B2
(45) Date of Patent: Dec. 6, 2005

(54) RECYCLED MATERIAL AND MIXING MACHINERY

(75) Inventor: Frank Owen, Northampton (GB)

(73) Assignee: Keanes Limited, London (GB)

( * ) Notice: Subject to any disclaimer, the term of this patent is extended or adjusted under 35 U.S.C. 154(b) by 27 days.

(21) Appl. No.: 10/333,489

(22) PCT Filed: Jul. 9, 2001

(86) PCT No.: PCT/GB01/03083

§ 371 (c)(1),
(2), (4) Date: Jan. 16, 2003

(87) PCT Pub. No.: WO02/05978

PCT Pub. Date: Jan. 24, 2002

(65) Prior Publication Data

US 2003/0164418 A1 Sep. 4, 2003

(51) Int. Cl.[7] ............................ B01F 13/10; B09B 3/00
(52) U.S. Cl. .............................. 366/6; 366/14; 366/37; 366/50; 404/92
(58) Field of Search .............................. 366/2, 6, 8, 14, 366/18, 19, 20, 33, 34, 35, 37, 38, 50; 37/403; 404/75, 92

(56) References Cited

U.S. PATENT DOCUMENTS

| | | | | | |
|---|---|---|---|---|---|
| 4,071,226 | A | * | 1/1978 | Miller | |
| 4,072,435 | A | * | 2/1978 | Coho et al. | |
| 4,089,053 | A | * | 5/1978 | Umphrey et al. | |
| 4,219,279 | A | * | 8/1980 | Haws | |
| 4,406,548 | A | * | 9/1983 | Haws | |
| 4,551,024 | A | * | 11/1985 | Clapp | |
| 4,579,459 | A | * | 4/1986 | Zimmerman | |
| 4,586,824 | A | * | 5/1986 | Haws | |
| 4,624,575 | A | * | 11/1986 | Lantz | |
| 4,712,919 | A | * | 12/1987 | Bouldin | |
| 4,768,884 | A | * | 9/1988 | Elkin | |
| 4,830,537 | A | | 5/1989 | Munro et al. | |
| 4,874,283 | A | * | 10/1989 | Hurley, Jr. | |
| 4,913,586 | A | | 4/1990 | Gabbita | |
| 5,005,980 | A | * | 4/1991 | Zimmerman | |
| 5,433,520 | A | * | 7/1995 | Adams et al. | |
| 5,468,435 | A | | 11/1995 | Hancock | |
| 5,711,637 | A | | 1/1998 | I | |
| 5,951,751 | A | | 9/1999 | Williams et al. | |
| 5,988,937 | A | * | 11/1999 | Komoriya et al. | 404/90 |
| 6,000,641 | A | * | 12/1999 | Komoriya et al. | 241/29 |
| 6,183,159 | B1 | * | 2/2001 | Hashimoto et al. | 404/76 |

(Continued)

FOREIGN PATENT DOCUMENTS

DE 3520149 12/1986

(Continued)

*Primary Examiner*—Charles E. Cooley
(74) *Attorney, Agent, or Firm*—Collard & Roe, P.C.

(57) ABSTRACT

Site-won spoil from an excavation which is a predominantly non-granular cohesive material can be converted into a material suitable for immediate use as a backfill material by a process of mechanically mixing the spoil with between 0 and 30% by weight or volume of added granular material and between 1 and 10% by weight or volume of a powder material comprising 1–5% lime or with the addition of 1–5% cement and/or 1–5% pulverized fly ash. The process works well with clay soils and the range of suitable spoil can be extended by adding cement to the powder material. The proportions in the mixture are chosen in dependence on the clay and moisture content of the spoil. A machine which can be set to mix the ingredients and water in the correct proportions on site is also described.

10 Claims, 3 Drawing Sheets

U.S. PATENT DOCUMENTS

| | | | | |
|---|---|---|---|---|
| 6,595,446 | B1 * | 7/2003 | Kamoshida et al. | 241/101.2 |
| 6,811,300 | B2 * | 11/2004 | Kamoshida et al. | 366/132 |
| 6,837,609 | B1 * | 1/2005 | Kamoshida et al. | 366/132 |
| 6,874,973 | B1 * | 4/2005 | Yoshida | 404/91 |
| 2004/0170083 | A1 * | 9/2004 | Owen | 366/154.1 |

FOREIGN PATENT DOCUMENTS

| | | | |
|---|---|---|---|
| DE | 3520149 | A1 * | 12/1986 |
| DE | 4235355 | | 12/1993 |
| DE | 19524326 | | 1/1996 |
| EP | 0343 154 | | 8/1992 |
| EP | 0675232 | | 10/1995 |
| EP | 0 974 702 | | 1/2000 |
| EP | 1146172 | | 10/2001 |
| FR | 2558862 | | 2/1985 |
| FR | 2756769 | | 6/1998 |
| FR | 2 777 305 | | 10/1999 |
| GB | 2064931 | | 6/1981 |
| GB | 2258672 | | 2/1993 |
| HU | 212045 | | 1/1996 |
| JP | 52-95736 | | 8/1977 |
| JP | 3-172403 | * | 7/1991 |
| JP | 3186334 | * | 8/1991 |
| RU | 2117090 | | 8/1998 |
| SU | 392030 | | 4/1971 |
| SU | 546679 | | 8/1974 |
| SU | 576297 | | 5/1976 |
| WO | WO 98/50319 | | 11/1998 |

* cited by examiner

RECYCLED MATERIAL AND MIXING MACHINERY

CROSS REFERENCE TO RELATED APPLICATIONS

Applicants claim priority under 35 U.S.C. §119 of GREAT BRITAIN Application No. 0017657.3 filed on 19 Jul. 2000; GREAT BRITAIN Application No. 0020851.2 filed on 24 Aug. 2000; and GREAT BRITAIN Application No. 0101764.9 FILED: 23 Jan. 2001. Applicants also claim priority under 35 U.S.C. §365 of PCT/GB01/03083 filed on 9 Jul. 2001. The international application under PCT article 21(2) was published in English.

BACKGROUND OF THE INVENTION

1. Field of the Invention

The present invention relates to a process of creating a composite material by recycling site-won materials that would otherwise be waste. Such material is suitable for use as backfill in road work trench excavations. The specification also describes a novel machine for carrying out the process of the invention.

There is considerable interest in the re-use of site-won materials at present as this provides savings in the cost of new materials and avoids the creation of large quantities of waste that need to be transported away from the site and disposed of in landfill sites.

The present invention concerns the re-use of site won spoil that is predominantly non-granular cohesive material. This includes clay soils and soils which contain at least 20% clay so that they are cohesive. It is not suitable for use in chalk areas or on rocky ground.

PERFORMANCE REQUIREMENTS OF SUBSTITUTE AGGREGATE MATERIALS

2. Description of the Related Art

In order to be used in road construction in the United Kingdom the materials used must achieve certain "performance requirements". These requirements include the criteria for the Utilities' Clegg Test and satisfaction of the performance requirements of the Department of Transport as set out in paragraphs 803 and 804 of the Specification for Highway Works 1991. The practice and procedure is further set out in the Code of Practice on the New Roads and Street Works Act 1991 entitled "Specifications for the Reinstatement in Highways" published in June 1992 by the Highways Authorities and Utilities Committee (H.A.U.C.). These documents specify the engineering properties required for materials that can be used in certain situations and in particular define Type 1, Type 2 and Type A materials that are needed as the sub-base and backfill of road and pavement structures. For the purposes of this specification references to Type 1, Type 2 or Type A materials mean materials that satisfy the performance requirements for such materials set out in the above documents.

More generally materials for use in road works outside the UK must satisfy similar performance requirements as set down by the relevant authorities and the use of the term "performance requirements" should be construed as referring to relevant performance requirements to be satisfied in order to allow an undertaker of road works to adopt alternative materials.

The performance of the various types of material is conveniently determined by their percentage CBR (Californian Bearing Ratio) value. CBR testing can be carried out in a laboratory or in the field. CBR is an empirical test and is best measured as initially intended although other test devices such as the Clegg Impact Hammer, various static and dynamic cone penetrometers, and the plate bearing test can be used to determine approximate estimates of CBR.

TECHNICAL PROBLEM

When excavations are needed to repair or install utility cabling and pipework, the contractor will typically employ a haulier to remove the excavated material. This waste is deposited in landfill sites. The waste will normally be a mixture of clay and old aggregate material. There is a cost both of transport and access to suitable landfill sites to this exercise.

The contractor must also purchase new material to backfill the excavations. New material is often derived from crushing and screening quarried stone, sea-dredged materials or land based sand and gravels. If the site of the excavation is distant from suitable sources of such material, the cost of importing relatively small quantities of such material of the required specifications can be expensive. Moreover quarrying has a considerable environmental impact.

While it is clearly desirable to use the spoil from the excavation to backfill, this material seldom satisfies the performance requirements. The technical problem is therefore to process the site-won material to produce materials achieving Type 1, Type 2 or Type A performance requirements so that they can at least in part be used as backfill in restoring the original carriageway, pavement and verges.

A further technical problem is to provide a machine that can carry out such a process efficiently on site to enable immediate re-use of the material.

PRIOR ART

It has been proposed to re-use crushed demolition materials, particularly concrete and asphalt etc. Concrete can be crushed to the required size to comply with the Type 1, Type 2 or Type A performance requirements for a high percentage of the input material. However there is seldom waste material of this nature in the case of street excavations.

In a separate technical field it is also known to stabilise soft and weak clay soils by rotovating the ground in situ with the addition of a small percentage of lime, together with a small quantity of cement if necessary. This process is described in Digest No. 058 of February 1999 published by the Materials Advisory Service and available on the Web at http://www.planning.detr.gov.uk/aas/index.htm.

A process has been described in FR-A-2 777 305 (Electricite de France) in which a machine is used to recycle granular material with small amounts of impurities such as clay and silt. For this purpose the machine employs a screening and crushing process and would not be applicable to site won spoil which is predominantly non-granular cohesive material.

In addition various proposals have been made for the lime stabilisation of soil either in situ as in GB-A2 258 672 (Roxbury) or by the creation of a flowable mixture which takes a number of days before it has acquired the necessary strength to support further work as in FRA-2 558 862 (Vidal). DE-4235355 (Suilmann) discloses a process for laying pipes, cables or the like for which a trench is dug by means of an excavator. When the pipes are laid in the trench, the trench is then backfilled by returning the excavated soil material which is conveyed on a conveyer belt. An unspecified amount of cement and/or lime is added to the excavated soil material on the conveyer belt. In practice, none of these prior teachings are a practical way of using site won material as backfill during trenching in order to meet the strict performance requirements and therefore solve the problem of rapid and economic reinstatement of the original road structure.

SUMMARY OF THE INVENTION

In accordance with the present invention there is provided a process when used for recycling site-won spoil comprising predominantly non-granular cohesive material from an excavation into a material immediately suitable for use as a backfill, comprising the step of mechanically mixing the spoil with between 0 and 30% added granular material and between 1 and 10% of a powder material comprising lime or lime with the addition of cement and/or pulverised fly ash in an automatically powered machine that rotavates the components together into the output material. For example, the powder material may comprise 1–5% lime or 1–5% lime with the addition of 1–5% cement and/or 1–5% pulverised fly ash.

The term pulverised fly ash is used here. The material is also referred to as pulverised fuel ash or PFA. Preferably this is material conforming to BS3892 parts 1 and 2 or selected conditioned PFA, which conforms to class 7B of the Specification for Highway Works 600 Series.

The process requires an automatically powered machine since manual mixing has the disadvantage that it is labour intensive and it is difficult to exercise good quality control in order to produce a consistent product. Therefore, in accordance with the present invention, a machine is proposed, which can be set to provide different mix ratios depending on the site conditions in order to deliver a consistent material. Preferably the machine is mobile so that it can readily be moved from site to site.

Whereas DE-4235355 provides a machine for recycling site-won spoil comprising predominantly non-granular cohesive material from an excavation for immediate re-use as a backfill, comprising means for receiving excavated cohesive material and means for adding a measured amount of powder material, the machine of the present invention is characterised in that it further comprises means for amalgamating the excavated cohesive material with added granular material, mixing means having at least one mixing screw for mixing the components and discharging them from the machine, water supply means providing a water supply to the mixer and means for controlling the proportions of water, spoil, granular material and powder incorporated into the mix.

PERCENTAGES

Percentages given in this specification can be read as being by either volume or by weight but all the percentages must be read in the same way.

ADVANTAGES OF THE INVENTION

The process allows readily available site-won material to be recycled and reduces the landfill requirement by up to 97%. Further it reduces the use of natural resources and no natural material tax is payable. On local or statutory authority projects, use of this process will assist in meeting recycling targets.

The process is suitable for use in all areas except chalk and can either be carried out on or close to the site, thereby reducing transport costs considerably.

BRIEF DESCRIPTION OF DRAWINGS

In order that the invention may be well understood, an embodiment thereof will now be described, by way of example only, with reference to the accompanying diagrammatic drawings, in which.

DESCRIPTION OF PREFERRED EMBODIMENT

Figure 1:
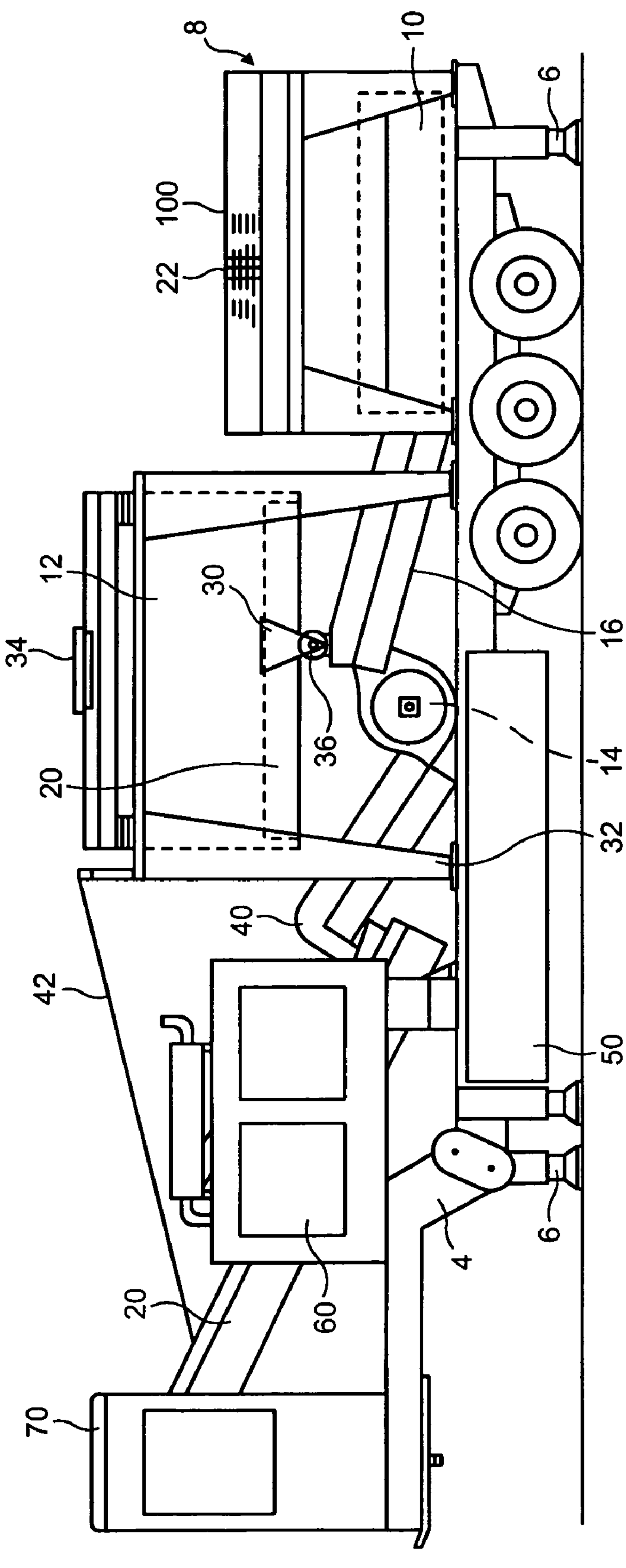
FIG. 1 shows a side view of a first embodiment of a machine for carrying out the process of the invention.

In order to recycle the spoil from a trench excavation it is first necessary to ascertain its clay and moisture content. The process is designed for a predominantly non-granular cohesive material such as one with at least 20% clay. With such material, the process will be effective with the addition of up to 10% powder. In most circumstances the material will be composed of spoil, added granular material and powder material which can be up to 5% lime or lime with the addition of between 1 and 5% cement and/or 1–5% pulverised fly ash.

The process is found to work best with clay soils which will coagulate into a suitable structure with the addition of lime only. For other soils or ones with a high silt and/or high moisture content it may be necessary to add granular material. The maximum size of this added granular material is 75 mm as per the H.A.U.C. Specification. This added granular material can be naturally occurring or be recycled. For example crushed concrete and asphalt from the site could be used.

The best mix of added granular material and powder material with the spoil can readily be determined using the above guidelines and a knowledge of the clay and moisture content of the spoil.

In order to produce the recycled material the following manual method maybe employed:

1. Spread spoil to the required depth to produce the desired volume or weight proportions
2. Spread a layer of added granular material if required on the spoil layer
3. Spread the powder material of lime or lime with the addition of cement over these layers
4. Mechanically mix the materials
5. Leave for 4–6 hours to mature
6. Mechanically mix again
7. Stockpile forming sides to allow water run-off The mixing is carried out by any mechanical method such as by hand with shovels or with the use of mechanical rotavating machinery, mobile mixing machinery or by static mixing plants.

The spoil could be removed to an off-site location for the process to be carried out. However the process is also suitable for producing small quantities manually on site.

EXAMPLE 1

A successful test was carried out using spoil from a site at The Arches, 24–28 Iverson Road, London NW6. The moisture content was 26% which conformed to BS1377 and the clay content was 67%. It was found that a material satisfying the Type 1, Type 2 and Type A performance requirement could be formed by mixing the spoil with 30% granular material in the form of crushed concrete and 3% lime.

EXAMPLE 2

An approval trial was carried out at Sawbridgeworth using spoil from trenching excavations. The site won material was a pale brown fine sandy clay with some gravel.

The site won material was mixed with 10% granular material in the form of gravel and 3% lime. The mixing was carried out mechanically.

Laboratory test results showed a CBR value for the top of 36% and for the base of 46%, comfortably exceeding the sub-base performance requirements when tested in an unsoaked condition. The test was repeated giving a top CBR value of 36% and a base CBR of 59% with a different sample tested seven days after remoulding. When a similar sample was tested in a soaked condition, after soaking for 168 hours producing a swell amount of 6 mm, the top CBR value was 31% and the base CBR value was 61%. A further CBR test was carried out after "curing" for 28 days in the mould. The top value was 50% and the base value was 68%.

A laboratory classification test (to BS 1377-2 1990) was carried out showing the material to be cohesive with a plastic index test of 24, confirming the modified material to be non-frost susceptible. A further frost test was carried out to BS 812-124 1989 amended as per Specification for Highway Works 1998 Clause 705 and the average heave of the specimen after 96 hours freezing was 4.2 mm compared to a maximum allowable heave of 15 mm.

Further, the modified material has been used in numerous excavations provided by a utility company and the Clegg tests have ranged between 25–40. This compares favourably with the performance requirement of no less than 18.

EXAMPLE 3

A controlled test was carried out using spoil from a site at The Arches, 24–28 Iverson Road, London NW6. The moisture content was 24% which conformed to BS1377 and the clay content was 61%. It was found that a material achieving a Clegg test of 32 and a dynamic core penetrometer CBR test of 38 could be produced using a mixture of spoil with 3% lime, 3% pulverised fly ash and 33% granular material. Using pulverised fly ash in addition to or instead of cement allows the material to be stored for longer periods.

Machine

Figure 2:
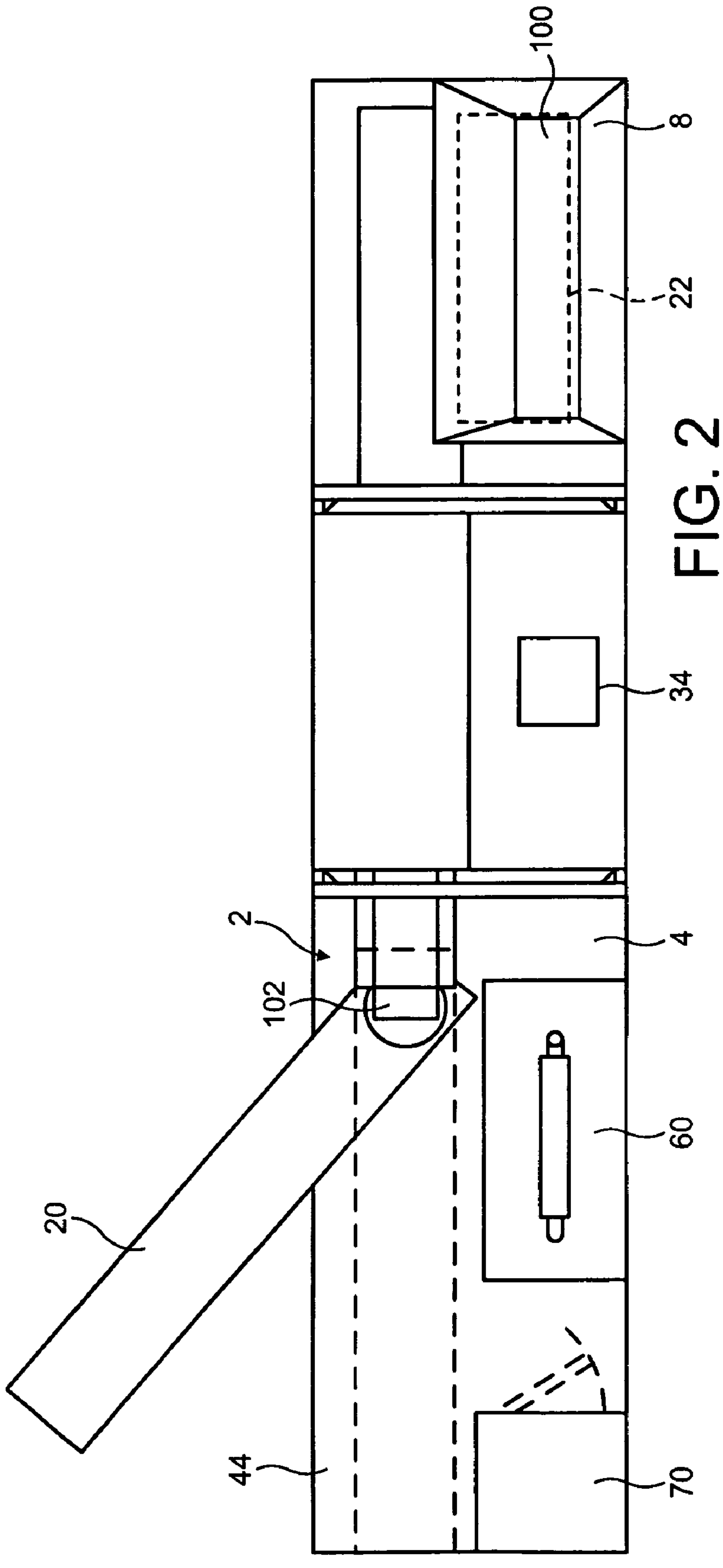
FIG. 2 shows a plan view of the machine of FIG. 1.

A machine 2 has been designed to provide effective and consistent implementation of the process. Two embodiments of the machine are shown and it will be appreciated that other layouts are also possible using existing or specially designed components. Like reference numerals are used for similar components in both embodiments. The machine of FIGS. 1 and 2 is described first. The machine 2 is mounted on an articulated tri-axle step-frame trailer 4 so that it can be moved to a trenching site. Hydraulic jacks, 6 are provided for stabilising the trailer when working on site. A hydraulic power pack (not shown) is provided to operate the jacks.

The machine is designed to move the material from one end to the other of the trailer. A hopper 8 provides for the input of site-won spoil and any necessary granular material, which is then passed through a primary rotavator 10. A powder silo 12 is mounted downstream of the hopper 8 so as to be able to feed a required measured amount of lime and/or cement and/or pulverised fly ash into a secondary rotavator 14. The secondary rotavator also receives spoil fed to it by a weighing feeder from 16 from the output of the primary rotavator 10. From the secondary rotavator 14 the material is fed to a mixer 20 which can be slewed out from the trailer under hydraulic control in order to deposit the material at a suitable location.

The trailer 4 also supports other equipment necessary for the operation of the machine including a generator 60, diesel tank, water tank 50, electrical cabinet, motor enclosure, access steps and shutter lights for night time operation.

Spoil to be recycled is tipped into the main loading hopper 8 together with any added granular material required by the prevailing conditions. The hopper 8 may be manufactured from 8 mm mild steel and is 3000 mm long and 1500 mm wide at the top. The hopper 8 has a removable hopper base which is manufactured from 10 mm HARDOX 400. The base is operated by a hydraulic cylinder and valve. The hopper 8 has a sloping safety grid 22 at its mouth. The safety grid 22 is 3000 mm long and 1500 mm wide and the spacing within the grid is 200 mm by 200 mm. A water spray bar 100 with stainless steel jets is optionally fitted over the hopper 8. The flow of water can be controlled automatically.

The hopper 8 contains the primary rotavator or clay pulverisor 10, which breaks up the input material. The primary rotavator 10 is located in the bottom of the hopper 8 in order to break up the material into a particle size of the order of 28 mm. The primary rotavator 10 is 2500 mm in length and is powered by a 75 kW motor. The weighing feed belt 16 extends from the base of the hopper 8 beneath the primary rotavator 10.

Material that has been processed by the rotavator 10 is thrown onto the weighing feeder belt 16. The speed of the weighing feeder belt 16 can be adjusted to control the feed rate. The weighing feeder belt 16 is 4300 mm long from the centers of its rollers and is 800 mm wide. It is fitted with a 4 kW motor and suitable gearing. The weighing feeder belt 16 provides continuous belt weighing using an electronic load cell, load cell amplifer, 4 kW inverter and a speed sensor. The weighing feeder belt 16 enables the weight of spoil and granular material being input to the mixer 20 to be continuously monitored.

The weighing feeder belt 16 delivers the pulverized material to the secondary rotavator 14. The secondary rotavator 14 is 700 mm in length and is powered by a 15 kW motor.

The powder silo 12 is situated above the secondary rotavator 14. This silo stores lime and/or cement and/or pulverised fly ash which is to be mixed with the pulverized spoil. The powder silo 12 is constructed from 4 mm mild steel and has an approximate holding volume of 7.5 cubic meters.

The silo consists of a hopper with support legs 32. A screw feeder 30 is located at the bottom of the powder silo 12. The powder silo 12 also has a cover and hatch 34. In order to monitor the contents of the hopper a load cell and load cell amplifier are provided.

The screw feeder 30 is 200 mm in diameter and 3800 mm long and is powered by a 3kW motor with suitable gearing and a 3 kW inverter. A variable speed metering vane feeder 36 is located at the bottom of the screw feeder 30. The variable speed metering vane feeder 36 may be a type BX19, which is fitted with stainless steel vanes and has a flexible outlet shield. The variable speed metering vane feeder 36 has a filler pipe with a standard UNICONE (registered trade mark) fitting and a 100 mm butterfly valve to close the feeder after filling. The variable speed metering vane feeder 36 is fitted with a filter pipe and sock.

The secondary rotavator 14 has heavy duty replaceable mixing blades, which are 700 mm wide. It has a 15 kW drive unit. This rotavator 14 mixes the powder through the spoil and granular material. The output of the rotavator 14 is delivered to a fixed speed conveyor 40. The fixed speed conveyor 40 is a flat chevron belt that is 1800 mm long and 800 mm wide. It is fitted with a 3 kW motor and suitable gearing. The fixed speed conveyor 40 delivers the spoil/powder material to the mixer 20.

The mixer 20 consists of a U-shaped trough containing a single shaft rotating auger type mixer. The mixer 20 is 5000 mm long and 400 mm wide and is fitted with a 7.5 kW motor with suitable gearing. The mixer 20 has a combination of replaceable mixing blades and auger flights. The rotation of the auger within the mixer 20 causes the spoil and powder material to progress along the mixer 20.

The mixer 20 is supported on a winch cable 42 which enables it to be raised and lowered. Slewing of the mixer 20 in an horizontal plane is hydraulically controlled. The trailer 4 includes a parking crutch 44 to support and locate the mixer 20. The parking crutch 44 has suitable lashings to secure the mixer 20 during transit.

A water spray bar 102 is fitted over the inlet of the mixer 20. The water flow to the spray bar can be regulated by an operator. A control value and flow-meter are also provided.

A water tank 50 is fitted to the underside of the trailer 4. The approximate dimensions of the water tank 50 are 3500 mm in length, 750 mm in width and 750 mm in height. The working capacity of the tank is 1500 litres approximately. A protective bumper rail (not shown) can be fitted around the water tank 50 to protect it.

A power generation unit 60 is mounted on the trailer 4. A 200 kva generating set is provided to run all the machine functions for the primary rotavator 10, weighing feeder 16, secondary rotavator 14, powder silo 12, conveyor 40, mixer 20 and a water pump.

A water pump (not shown) is fitted under the power generation unit 60 and is capable of pumping between 40 to 200 litres per minute to the or each water spray at the hopper 8 and mixer 20.

Controls for the machine are housed in a control cabin 70, which has lockable antivandal shutters. The controls include a computer which controls a sequenced starting and stopping of each machine function. The computer monitors the material fed on to the feeder 16 and also monitors the feed rate of the powder by loss of weight as monitored by the load cell in the powder silo 12. The computer also monitors the total amount of material fed on to the feeder belt 40. Water, if added at the spray at hopper 8 or at the mouth of the mixer 20, will be measured by a flow meter. Rates of feed of raw materials are displayed on a VDU. A printer can be used to print data and reports.

It will be appreciated that by setting the speed of the belts 16 and 40, and the supply to the water sprays, the relative proportions of the ingredients can be regulated. These settings can then be stored for later use so that a number of different "programs" for varying site conditions can be applied to the machine so that it can be adapted speedily for use at different locations. The machine can also be used to carry out experiments with different proportions to fmd the best settings for a new type of local spoil.

In an alternative embodiment the mixer 20 may be of a design which uses two mixing screws rotating towards each other. The mixer may also have several stages with differing screw configurations.

Figure 3:
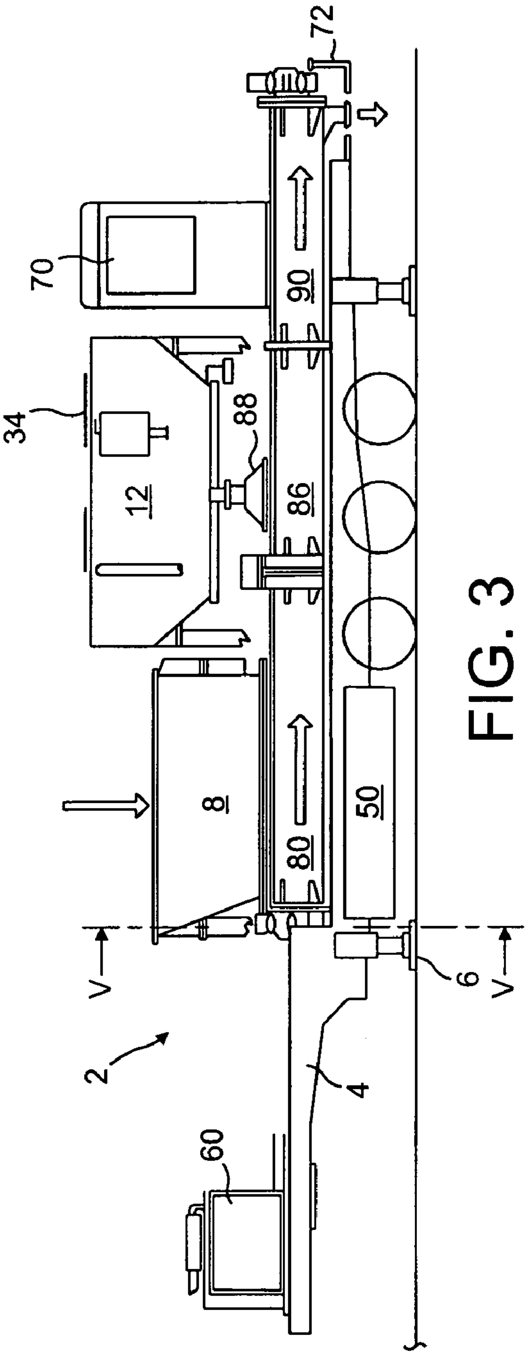
FIG. 3 shows an alternative embodiment of a machine.
Figure 4:
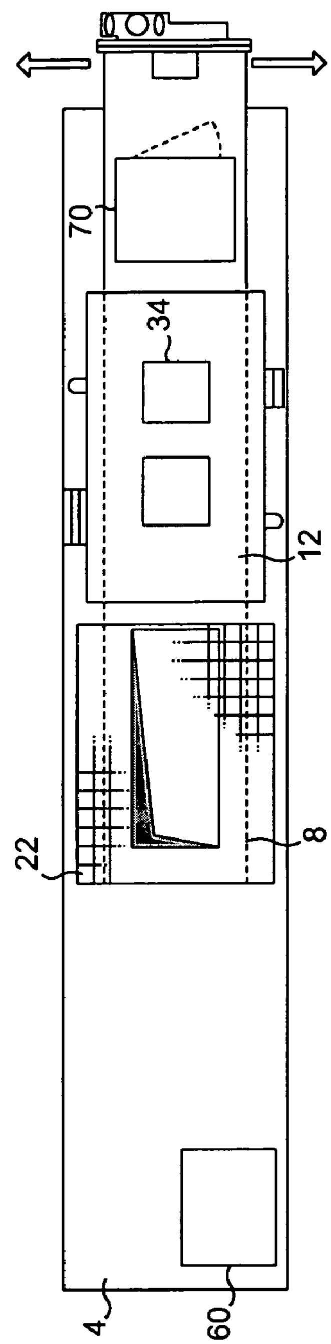
FIG. 4 shows a plan view of the machine of FIG. 3.
Figure 5:
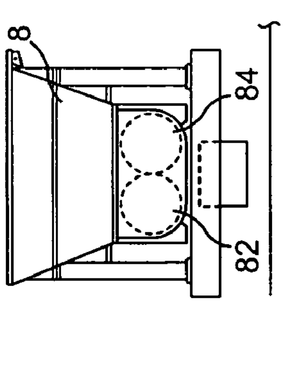
FIG. 5 shows a section on line v—v of FIG. 3.

FIGS. 3–5 show an alternative embodiment of the machine. Similar components have similar reference numerals. This design differs in the construction of the mixer. In this embodiment a multi-stage mixer is located in the base of the machine which also operates to transport the material towards a discharge end of the machine at which a fold back conveyer 72 can be located.

A first stage of the mixer 80 is located beneath the hopper 8. This is a twin screw rotavator with a hydraulic drive. The twin screws 82, 84 can be seen in FIG. 5. They rotate in opposite senses. The first stage 80 passes the spoil to a second stage mixer 86 positioned underneath the powder silo 12. An upper part of the housing of the second stage mixer 86 is open to an output from a stainless steel vane feeder 88, which delivers the powder material into the mixer. This second stage mixer 86 is also a weighing chamber with load cells. This enables the proportion of powder to spoil and granular material to be controlled. The second stage mixer 86 transports its output to a final stage mixer 90, which completes the mixing process and delivers the material to the discharge conveyer 72. Other features of the machine are as described in relation to the first embodiment.

It will be appreciated that a machine to carry out the mixing and measuring process could be constructed to numerous different designs, only two of which have been described. The capacity of the described machine is suitable for processing spoil into a material that can be used as backfill virtually immediately without a prolonged period of maturation. Typically the output of the mixer can be directed to a suitable storage area alongside the trench, where it is readily accessible after a few hours maturation, while the piping or other object of the roadworks is installed, for use as backfill to reinstate the sub-base.

The mobile mixer as described can also be used at a central mixing point away from the excavations. Alternatively the machine can be assembled for static operation at such a site.

What is claimed is:

1. A process for recycling site-won spoil comprising predominantly non-granular cohesive material from an excavation into a material immediately suitable for use as a backfill, comprising the steps of loading extracted site-won spoil into a hopper of a machine for recycling site-won spoil, loading up to 30% added granular material into the hopper, breaking up site-won spoil and mixing it with the added granular material in the hopper with a rotavator, transferring the broken up site-won spoil and granular material from the hopper to a mixing means, adding between 1 and 10% of a powder material comprising lime or lime with the addition of cement and/or pulverised fly ash into the mixing means and mixing the components together into an output material.

2. A process as claimed in claim 1, wherein the site-won spoil comprises at least 20% clay.

3. A process as claimed in claim 1, wherein up to 5% cement is mixed with the spoil.

4. A process as claimed in claim 1, wherein up to 5% lime is mixed with the spoil.

5. A process as claimed in claim 1, wherein up to 5% pulverised fly ash is mixed with the spoil.

6. A process as claimed in claim 1, wherein water is added to the material during mixing.

7. A process as claimed in claim 2, wherein 3% of lime is used as the powder material.

8. A machine for recycling site-won spoil comprising predominantly non-granular cohesive material from an excavation for immediate re-use as a backfill, comprising means for receiving site-won spoil and added granular material, means located in the receiving means for breaking up the site-won spoil and mixing it with the added granular material, mixing means located outside the receiving means having at least one mixing screw for mixing the components and discharging them from the machine, means for transferring the broken up site-won spoil and granular material to the mixing means, means for adding a measured amount of powder material into the mixing means, water supply means providing water supply to the receiving means and the mixing means, and means for controlling the proportions of water, broken up site-won spoil/granular material and powder incorporated into the mix.

9. A machine as claimed in claim 8, further comprising means for storing different mix ratios depending on the site conditions in order to deliver a consistent backfill material.

10. A machine as claimed in claim 8, mounted on a trailer so as to be transportable.

* * * * *

UNITED STATES PATENT AND TRADEMARK OFFICE

CERTIFICATE OF CORRECTION

PATENT NO. : 6,971,783 B2 
DATED : December 6, 2005
INVENTOR(S) : Owen

It is certified that error appears in the above-identified patent and that said Letters Patent is hereby corrected as shown below:

<u>Title page,</u>
Insert Item
-- [30] Foreign Application Priority Data

| | | |
|---|---|---|
| January 23, 2001 | (UK) | ........................ 0101764.9 |
| August 24, 2000 | (UK) | ........................ 0020851.2 |
| July 19, 2000 | (UK) | ........................ 0017657.8 --. |

Signed and Sealed this

Fourteenth Day of February, 2006

JON W. DUDAS
*Director of the United States Patent and Trademark Office*